Fig. 2

INVENTORS
Mack D. Bowen
Joseph T. Hamrick
ATTORNEYS

United States Patent Office 3,179,500
Patented Apr. 20, 1965

3,179,500
HYDROGEN GENERATION AND PURIFICATION SYSTEM
Mack D. Bowen and Joseph T. Hamrick, Roanoke, Va., assignors to Thompson Ramo Wooldridge Inc., Cleveland, Ohio, a corporation of Ohio
Filed Apr. 24, 1961, Ser. No. 104,882
5 Claims. (Cl. 23—250)

This invention relates to generation and purification of hydrogen, and, more particularly, to improved methods and means for producing purified hydrogen for use in fuel cells and the like.

Heretofore, difficulty has been encountered in the design of fuel cells employing hydrogen and oxygen as the reactants for use in operating components of underwater vehicles such as submarines. The storage of liquid hydrogen on a submarine presented many serious difficulties in terms of safety, storage and bulk density. An alternative method of supplying hydrogen to such fuel cells involved generation of hydrogen, as needed, from a substance which is not cryogenic and which does not require unusual handling or storage. In the confined limited space available for the means to generate and purify hydrogen for fuel cell applications in such underwater vehicles, existing equipment is, as far as we are aware, unavailable.

With the system of the present invention, we substantially overcome the problems and difficulties of the prior art and provide for generation and purification of hydrogen for fuel cell applications in a system which is compact and simple in construction and efficient and high speed in operation.

It is therefore an object of the present invention to provide an improved system for generation and purification of hydrogen.

Another object of the present invention is to provide an improved system for generating and purifying hydrogen which is adaptable for employment with underwater vehicles such as submarines and the like.

Still another object of the present invention is to provide an improved system for purifying hydrogen produced catalytically and removing the undesirable byproducts of the catalytic reaction of the hydrogen producing components.

A further object of the present invention is to provide a system for generating and purifying hydrogen wherein water produced as a byproduct of a fuel cell is employed as one of the reactants for producing hydrogen supplied to the fuel cell.

A still further object of the present invention is to provide a regenerative system for producing and purifying hydrogen wherein water supplied as a byproduct from a fuel cell is reacted with an alcohol and the byproducts of the reaction are removed from the hydrogen which is then supplied to the fuel cell.

Another object of the present invention is to provide a system for generating and purifying hydrogen which is compatible with available submarine space limitations and which carries out a chemical reaction at high pressures to produce the hydrogen.

These and other objects, features and advantages of the present invention will become apparent from a careful consideration of the following detailed description, when considered in conjunction with the accompanying drawings, wherein like reference numerals and characters refer to like and corresponding parts throughout the several views.

Briefly stated, the present invention involves reaction of ingredients capable of liberating hydrogen and the subsequent purification of the byproducts of the reaction to obtain substantially pure hydrogen gas for subsequent utilization thereof in a fuel cell employed to operate components of an underwater vehicle such as a submarine.

Figures 1, 10:
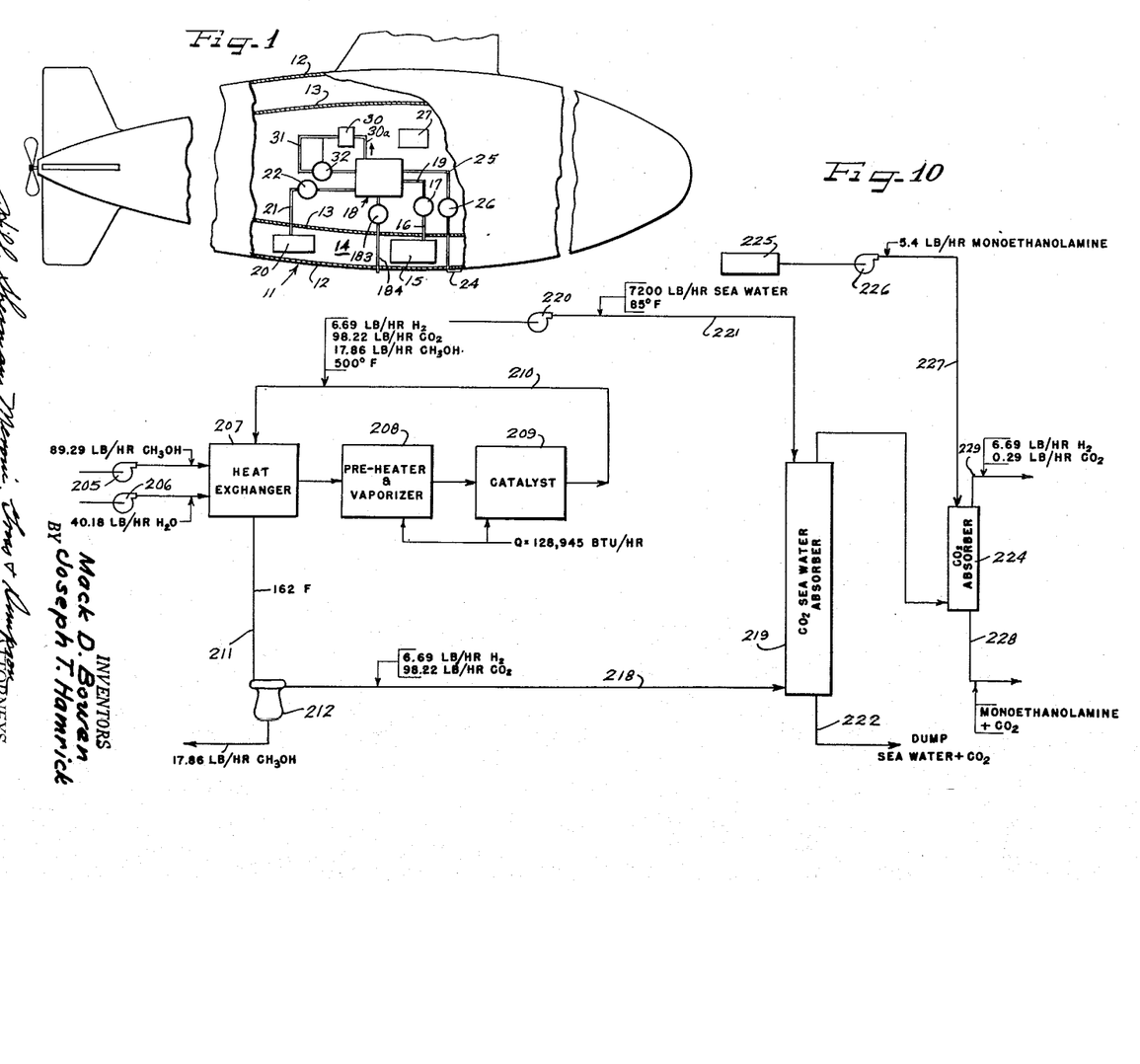
FIGURE 1 is a generally schematic view of a submarine employing the system of the present invention.
FIGURE 10 is a diagrammatic view of still another hydrogen generation and purification system.

Referring to FIGURE 1, there is shown schematically, an underwater vehicle, such as a submarine, generally indicated by the numeral 11, which comprises an outer pressure hull 12 and an inner hull 13 housing the power plant, personnel quarters and the like (not shown). The submarine 11 is of conventional construction and is propelled in a conventional manner.

The space 14 between the pressure hull 12 and housing hull 13 is employed in the practice of the present invention to house one or more containers, such as container 15. Container 15 may store one or more reactants employed for generating hydrogen. Container 15 may also store filtration ingredients employed for purifying the generated hydrogen. The container 15 is connected as by line 16 to a pump 17 which supplies the reactant to the hydrogen generation and purification system shown in block form in FIGURE 1 and indicated by the numeral 18, through a branch conduit 19. Other ingredients of the system 18 may be housed in a container 20 similar to the container 15 in space 14. Container 20 is communicated with the system 18 through line 21 which may be provided with a pump 22. Sea water employed as a non-reactive filtrant for purification of hydrogen is supplied through a line 24 to the unit or system 18 over line 25 and a pump 26 is provided for a supply thereof. The pumps 17, 22 and 26 may be controlled from a control unit 27 of conventional construction. A fuel cell 30 of conventional construction communicates with the unit 18 to receive the substantially impurity free hydrogen over line 30a.

For producing hydrogen gas to be employed in the fuel cell 30, water and an alcohol are preferably catalytically reacted in the generation and purification system 18. The water (hereinafter called fresh water) employed to produce hydrogen is available in adequate quantities as a byproduct from the fuel cell. The alcohol preferably employed is methanol ($CH_3OH$).

The supply of methyl alcohol will be stored in a pressurizable bladder in container 15, for example, and supplied therefrom through conduits 16 and 19 as by pump 17 to the generation and purification unit 18 whereas the fresh water will be supplied from the fuel cell 30 through a conduit 31 having its flow rate controlled by a pump 32.

Figure 2:
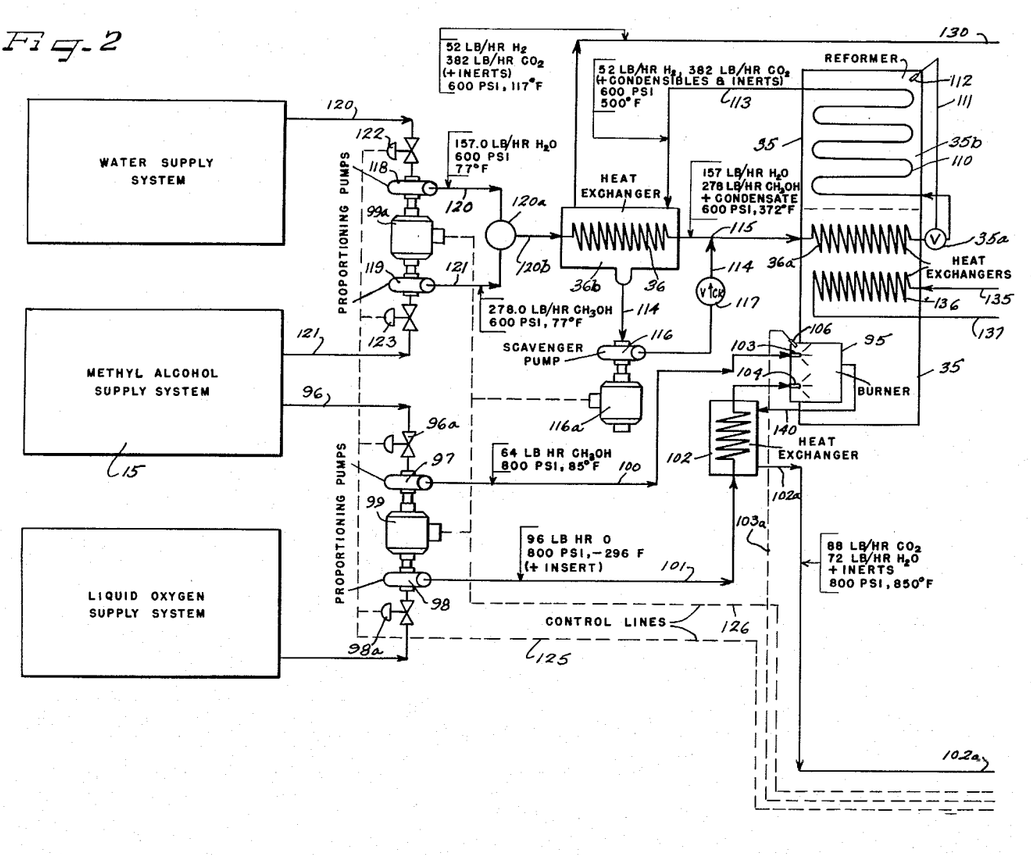
FIGURE 2 is a generally schematic view of the hydrogen generation and purification system generation section.
Figure 3:
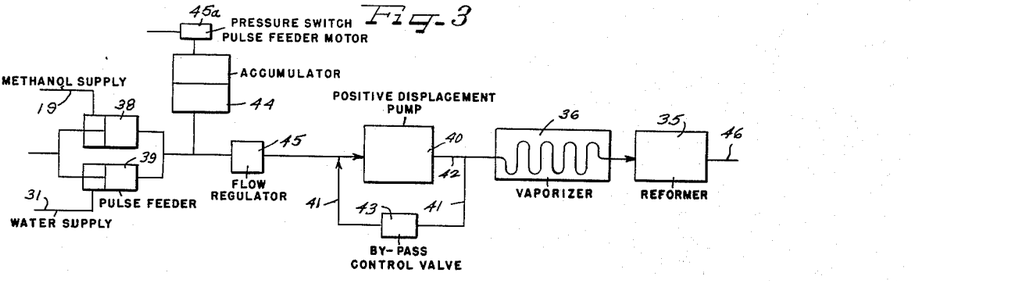
FIGURE 3 is a generally schematic view of a system for supplying reactants to a reactor for generating hydrogen.

Preferably, a mixture of fresh water and alcohol is supplied to a catalytic reformer 35 (FIGURE 2) in a gaseous state. For this purpose, methanol and fresh water are supplied to a pair of pulse feeder pumps 38 and 39 through lines 19 and 31. The pumps 38 and 39 are preferably conventional positive displacement pumps having fixed displacement ratios for supplying the methanol and fresh water at the required rate. The mixture is supplied from the pumps to the reformer 35 through vaporizer 36. To modulate flow while maintaining the displacement ratios fixed, a change in displacement is required and may be effected by either a change in pump speed or, where employing piston type pumps, a change in stroke. The displacement ratio may also be maintained by employment of low head rise pulse feeders 38 and 39 to supply the mixture of fresh water and methanol to a single high pressure pump 40 which is a positive displacement pump (FIGURE 3). Modulation of flow rates may be effected by diverting portions of the pump mixtures from the outlet to the pump inlet as required. A feed back system, as shown in FIGURE 3 includes a conduit 41 connected in the output conduit 42 of the pump 40. Conduit 41 has positioned therein a bypass control valve 43. When employing a feed back system such as above described, it is preferable that an acumulator 44 and flow regulator 45 be connected in the pulse feeder circuit. The accumulator pressure would actuate a pressure switch 45a controlling operation of the motor or motors of the pulse feeders 38 and 39. In the supply system appearing in FIGURE 3, the pressure in the reformer 35 drops with decreasing flow rate. Thus, at very low flow rates the pressure in the reformer is only slightly higher than the outlet pressure of the hydrogen conduit 46. During increase of the pressure to restore the full predetermined load requirements, a sizeable lag occurs while the system is building up to this full load pressure. Conversely a similar lag is provided in reducing the pressure. Regulation of the output of the generated hydrogen from the reformer 35 should eliminate the effects of pressure build-up and decrease in the following manner.

Figure 4:
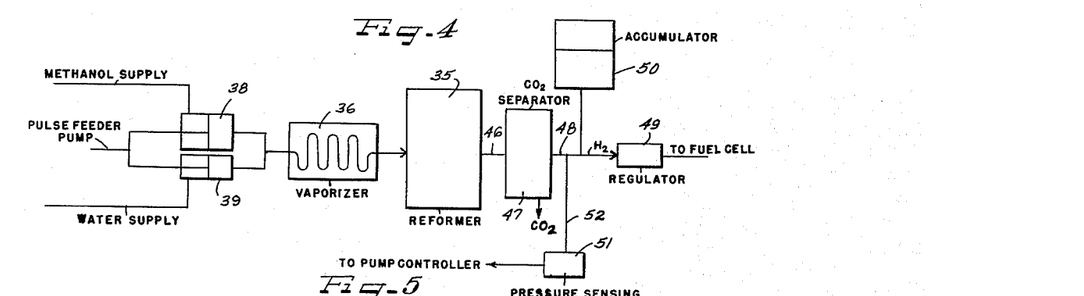
FIGURE 4 is a schematic view of an alternative embodiment of a system for supplying reactants to a reactor for producing hydrogen.

As appears in FIGURE 4, the gases exhaust through conduit 46 into a device 47 for separating the $CO_2$ from the hydrogen gas. From the unit 47 the hydrogen gas is exhausted through an outlet conduit 48 to the fuel cell (not shown).

A pressure regulator 49 is provided in the conduit 48 for maintaining a constant pressure to the fuel cell. At maximum flow rates, the pressure drop across the separator unit 47 results in low pressure downstream of the separator unit 47. If the demand imposed on the generation and purification system should decrease, the pressure in conduit 48 will increase. The regulator 49 maintains however, a constant supply pressure to the fuel cell, and, thus, any excess hydrogen produced in the separator due to a lag in response of the purification and generation system serves to increase the pressure in conduit 48 upstream of the regulator 49. If the total area of conduit 48 upstream of the regulator 49 is insufficient to contain the generated hydrogen, an accumulator 50 may be provided. In the arrangement shown in FIGURE 4, a pressure sensing device, such as a pressure switch 51 connected as by conduit 52 to the conduit 48 upstream of the regulator 49 may be provided to modulate the rate of flow of methanol and fresh water in proportion to the pressure changes sensed by the device 51. By employment of the regulator, the degree of control of the methanol-fresh water supply is increased and any pulsation or surges in the pumping system, pulse feeders 38 and 39, will be minimized and thus fuel cell operation is less likely to be affected thereby.

At low or zero load, the conduit 48 downstream of the regulator 49 will be at approximately the same pressure as the reformer 35 and, upon full load demand, will, therefore, maintain an adequate supply or reserve of hydrogen in the accumulator 50 or conduit 48.

The device 51 may also be provided to sense pressure in the accumulator 50, if desired. Pressure changes will occur as a result of contamination of the separator or accumulation of byproduct gases, such as methane, carbon monoxide, or nitrogen which may be produced as byproducts of the catalytic reduction of methanol and the fresh water.

The pressure sensing element 51 controlling the operation of the pumps for the pulse feeders may be hydraulic, pneumatic or electrical means, as desired, for controlling pump speed or if piston type pumps are employed, the piston stroke.

Figure 5:
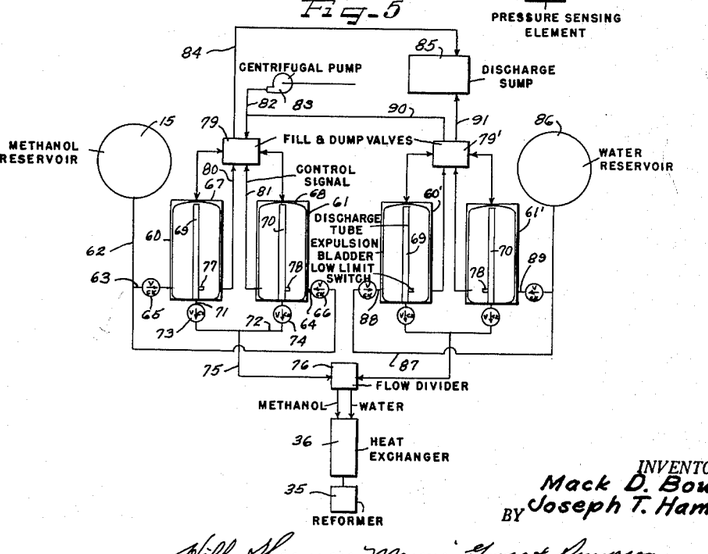
FIGURE 5 is a schematic view of another embodiment of a system for supplying reactants to a reactor for producing hydrogen.

Thus means are provided for regulating flow of the mixture of fresh water and methanol into the reformer and the flow of hydrogen from the reformer. In FIGURES 3 and 4 pump means are disclosed for supplying the mixture of methanol and fresh water in reaction proportions to the vaporizer. These pulse feed type pumps are well known in the chemical art. In FIGURE 5, a pressurization system for supplying methanol and fresh water to the reformer is shown.

In FIGURE 5, the liquid methanol reservoir or storage tank 15 communicates with a pair of auxiliary tanks 60 and 61 as by main conduit 62 and branch conduits 63 and 64 each of which is provided with a check valve 65 and 66 respectively. Tanks 60 and 61 are lined with pressurizable bladders 67 and 68 which are collapsible to force the methanol into a discharge tube 69 and 70 for supply of the liquid methanol through outlet conduits 71 and 72, each of which has a one way check valve 73 and 74 respectively therein. Conduits 71 and 72 communicate with a single conduit 75 which supplies the liquid methanol to a flow divider 76.

The tanks 60 and 61 provide alternate supply of the methanol to the reformer. Switch devices 77 and 78, when contacted by the bladder, are adapted to automatically refill the contacting bladder and actuate opening of the full bladder. The switches 77 and 78 actuate valve means 79 to selectively pressurize either tank 60 and 61 and permit the other tank to fill with liquid methanol received from the reservoir 15. The switches 77 and 78 may be connected as by lines 80 and 81 to actuate the valve means 79. The bladders in tanks 60 and 61 may be pressurized to force fuel through conduits 69 and 70 by sea water supplied through the valve means 79 through a conduit 82 under the influence of a centrifugal type pump 83. The sea water employed for this purpose may be received from the filtration unit as more fully hereinafter set forth.

Thus, means are provided for pressurized flow of methanol from the reservior 15 to the reformer for reaction with fresh water. Valve means 79 may also be dump valves for scourging the tanks 60 and 61. For this purpose the valve means 79 may communicate with a conduit 84 for supply of the pressurizing medium, sea water, to a discharge sump 85.

Fresh water may be supplied from the fuel cell over conduit 31 (FIG. 1) to a water reservoir 86. From the reservoir 86, the fresh water flows through a conduit 87 having branch conduits 88 and 89 for supply of the fresh water to a pair of bladder lined tanks 60' and 61'. The supply loop of the fresh water to the reformer is identical in construction and operation to the supply loop of the liquid methanol to the reformer and parts corresponding to the methanol supply loop parts are indicated by the same numeral as the corresponding methanol supply parts. The pressurization medium for feeding the fresh water from the containers 60' and 61' is received through valve means 79' over a branch conduit 90 communicating with the supply conduit 82 leading from the centrifugal type pump 83. The fresh water pressurization system is scavenged by valve 79' and conduit 91 communicating with the discharge sump 85.

The centrifugal type pump 83 is employed to increase the head of the pressurization medium, sea water, in order to provide adequate pressure for injection of the fresh water and methanol into the reformer since the water pressure in the source of the fresh water, the filtration unit, is approximately equal to that in the reformer. Alternatively a low head pump (not shown) may be substituted for the pump 83. The pressurization medium for supply of the methanol and water from the tanks 60, 61, 60' and 61' may be hydraulic fluid from the submarine hydraulic system rather than sea water.

Thus, simple and effective pressurization and pump means for supply of fresh water and the alcohol to the reformer are provided.

It will be appreciated that the pump systems shown in FIGURES 3 and 4 are employed as metering devices as well as pumps.

Preferably, the reaction of methanol and fresh water is carried out at a temperature of approximately 500° F. in the presence of a catalyst to form $CO_2$ and $H_2$. The vaporizers 36 (FIGURES 3–5) vaporize the liquid methanol and fresh water and raise the temperature of the mixture of gases to a level sufficient to permit catalytic reduction thereof in the reformer 35.

The reformer

Figure 2A:
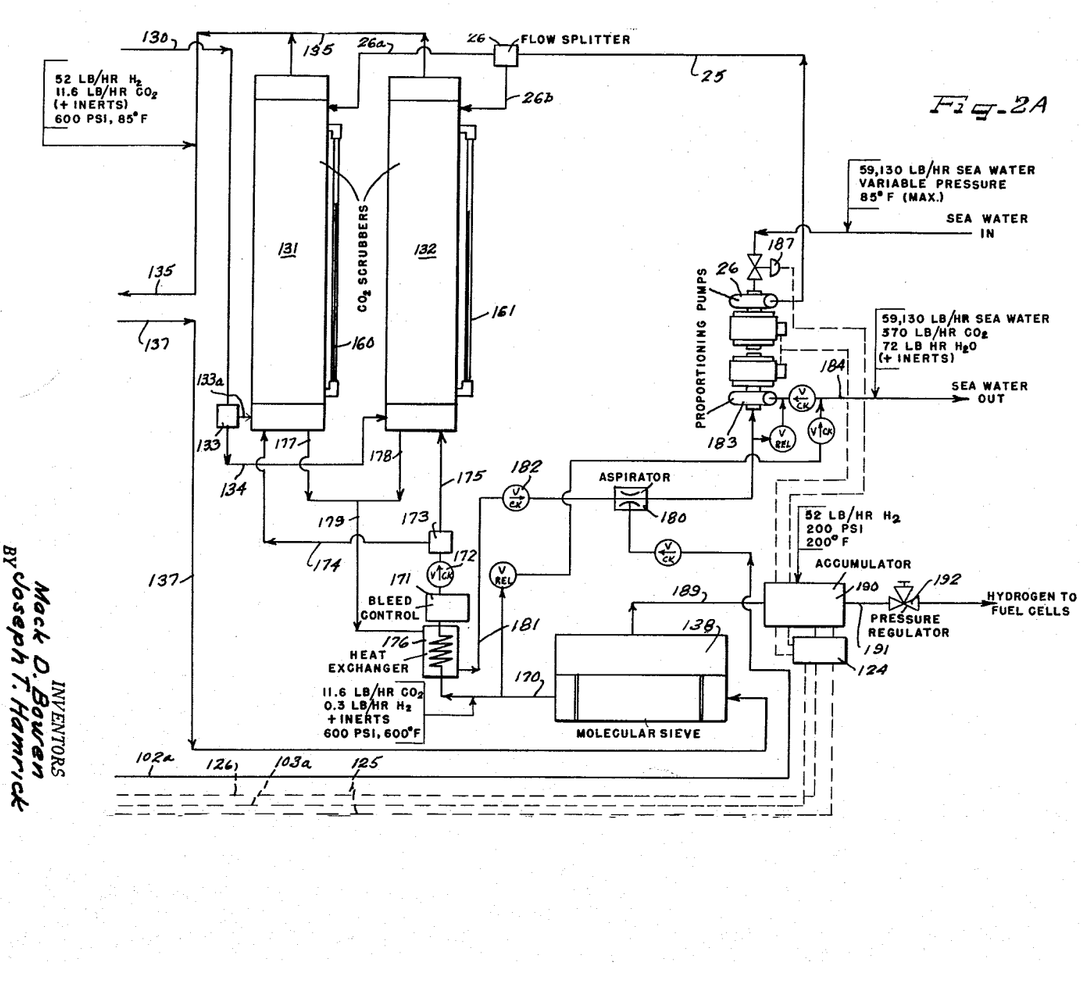
FIGURE 2a is a generally schematic view of the purification of FIGURE 2.

The reformer 35 is a tower or housing, the housing contains the catalyst for reforming methanol and water in a gaseous state. The catalyst is preferably in the form of lumps or pellets of such size as to provide a large mean surface area of contact with the gas. The housing supports the lumps or pellets under operating conditions and assures intimate contact between the reactants and the catalyst. The actual construction and placement of the lumps or pellets and numbers thereof depend primarily on the particular catalyst employed and the operating parameters involved, such as composition of reactants, pressure, temperature and space velocity (FIGURES 2 and 2a).

Many types of catalysts for heterogeneous catalysis are known and are primarily of the following types: natural catalysts, such as clay or bauxite; ignited catalysts, such as metallic oxide formed by thermal decomposition of inorganic salts; impregnated and ignited catalysts, such as are obtained by impregnating porous material with an inorganic salt followed by decomposition of the salt to a metallic oxide or a metal; precipitated catalysts formed by precipitation of finely divided insoluble compounds, and skeleton catalysts illustrated, for example by Raney nickel in which aluminum is reacted with caustic from an aluminum alloy to leave a lacy net work of highly active nickel. The catalyst, having been prepared by one of the above methods, is then activated. Numerous well known techniques are used for this purpose such as pretreatment with an inert gas, reduction with hydrogen, or roasting at elevated temperatures.

In catalytic reformation of methanol and water, the major reaction is:

$$CH_3OH + H_2O = 3H_2 + CO_2$$

This reaction is endothermic, and, when copper is used as the catalyst, takes place at a temperature of about from between 375 to about 485° F. A possible secondary reaction which may occur is:

$$CH_3OH = 2H_2 + CO$$

The byproduct carbon monoxide may be decreased by employement of an excess of water. However, trace amounts of CO will probably be present in the product stream regardless of the reaction proportion ratio of fresh water and methanol. Elimination of the carbon monoxide may also be provided for by selective poisoning of the catalyst to prevent formation of carbon monoxide or the catalytic reaction of carbon monoxide to carbon dioxide in the water gas shift process, after separation of hydrogen from the carbon monoxide. This reaction takes place in the presence of an iron oxide catalyst at a temperature of about 750 to about 950° F. and is slightly exothermic. The heat of reaction of the gaseous mixture of water and methanol at 500° F. is equal to 13.67.1 $K_{cal.}$/mole of $CH_3OH$. Generally, the generation of hydrogen from water and methanol has two primary advantages over reforming hydrocarbons to form hydrogen. Two of the primary advantages are minimum heat requirements and clean products. The former advantage is attributable to the low reaction temperature and relatively small amount of heat required per pound of hydrogen produced. The low reaction temperature in turn simplifies the design of the reformer, allows efficient utilization of the heating gases and eliminates the material problems inherent in any heat transfer and contaminant application at high temperature.

Heating of the reformer and maintaining the reaction temperature thereof and for heating gases entering molecular sieves, as more fully hereinafter discussed, requires a heat supply, such as a combustion chamber or gas generator. Preferably, the combustion chamber or gas generator is independent of the remainder of the system except for supply of methanol for reaction with liquid oxygen (FIGURE 2). The reaction chamber 95 (FIGURE 2) may be a conventional gas generator for reacting quantities of methanol and liquid oxygen or the burning of the methanol can be carried out in several stages which avoids the high combustion temperatures produced with stoichiometric, or near stoichiometric combustion. Methanol is injected into the first stage with a reduced amount of $O_2$ to produce the desired combustion temperature. The fuel rich gases are cooled between the first and second stage to near the auto ignition temperature. Oxygen is again injected at stage 2 in the amount to produce the desired combustion temperature. The process is repeated in a number of stages allowing practically all the methanol to be burned with a controlled maximum temperature of combustion. The methanol and liquid oxygen are supplied (FIG. 2) from the methanol source 15 over line 96 to a pump 97 and the liquid oxygen is supplied from a source 20 over line 21 to a pump 98. A motor 99 controls the flow of liquid oxygen and methanol in reaction proportions through the pumps over lines 100 and 101 to the burner 95. The liquid oxygen is preferably passed through a heat exchanger 102 of conventional construction for vaporization thereof. Methanol is supplied through one or more injectors 103 whereas the vaporized oxygen is supplied over lines 101 through one or more injectors 104 to the burner 95. Valves 96a and 98a are actuatable to control flow through the respective lines in response to a signal received from a remote source.

Preferably the liquid oxygen pump 98 is of the piston type. The alcohol and liquid oxygen are reacted by ignition means 106 which may be a spark ignition or glow plug. Once ignition has started, the reaction between the methanol and liquid oxygen is self-sustaining and the igniter 106 may be deenergized. A pressurization system for supplying the liquid oxygen may be alternately provided, if desired.

Returning to the hydrogen generation operation the vaporizer 36 may be a conventional heat exchanger cooperating with a second vaporizer 36a which is a conventional heat exchanger to complete vaporization of the mixture of methanol and fresh water. The vaporizer or heat exchanger 36a is positioned in the reformer 35 in heat exchange relation with the gas generator chamber 95 as the heat source for the heat exchanger. A control valve 35a is provided for preventing flow of the gaseous mixture into the coils 110 containing the copper catalyst pellets, for assuring proper heating of the mixture of alcohol and water to the desired reaction level and heating of the catalyst tube 110 to the proper temperature before flow of the gaseous mixture into tube 110 occurs. Valve 35a may be connected as by line 111 to a thermocouple 112 in the catalyst reformer 35. The probe 112 actuates the valve 35a to the open position when the temperature in the chamber 35b is at the proper reaction level.

Thus, means are provided for preventing flow of the gaseous mixture of methanol and fresh water until the reformer has reached the proper operating temperature. The products of reaction in the reformer 35 flow through a line or conduit 113 into the housing 36b of the heat exchanger 36 for heating and vaporization of the mixture of methanol and fresh water in the primary vaporizer 36. A scavenging system including a bypass 114 is provided for recirculating condensed excess water from the gaseous reaction products to the output conduit 115 of the heat exchanger 36. Pump means 116 control operation of the scavenging system through conduit 114 which will also be provided with a one-way check valve 117. Pump 116 is operated by a motor 116a connected in circuit with motor 99, controlling flow to the burner 95 and motor 99a controlling the proportioning pumps 118 and 119 suppling the fresh water and methyl alcohol through conduits 120 and 121 respectively to pumps 118–119. Valves 122 and 123 are operatively responsive to a signal received from a remote source, such as control unit 124, (FIGURE 2a) over line 125.

In operation of the hydrogen gas generation system, the control unit 124 actuates valves 96a and 98a to permit flow of methyl alcohol and liquid oxygen to the proportioning pumps 97 and 98. The unit 124 also actuates over a control line 126 the motor 99 to operate the proportioning pumps 97 and 98 which supply alcohol to the burner 95 and liquid oxygen to the vaporizer 102 over lines 100 and 101 respectively. The control unit 124 actuates the ignitor 103 over control line 103a to start burning of the alcohol and oxygen flow from the burner into the chamber 35 to heat exchanger 36a and tubes 110. The control unit 124 also actuates the valves 122 and 123 over line 125 to permit flow of the fresh water and alcohol to the pumps 118 and 119. The motor 99a is energized to pump the water and alcohol over lines 120 and 121 on the output side of the pumps for mixture as at 120a for supply thereof through line 120b to the heat exchanger 36. From the heat exchanger 36 the vaporized mixture of fresh water and methyl alcohol flow over line 115 to heat exchanger 36a. The probe 112 actuates valve 35a when the reaction temperature is reached in the reformer 35 and permits flow of the gaseous mixture into line 110.

In flowing through line 110 the catalyst therein reforms the methyl alcohol and fresh water to $H_2$ and $CO_2$. The products $H_2$ and $CO_2$ flow then from the reformer 35 through line 113 into housing 36b in heat exchange relation with the line 120b for vaporizing the mixture of water and liquid methyl alcohol.

From the heat exchanger 36 the $H_2$ and $CO_2$ products flow through line 130 into the purification section of the system for removal of $CO_2$ from the hydrogen.

The exhaust gases from the burner 95 flow through line 140 into the heat exchanger 102 for vaporizing the liquid oxygen flowing through line 101. The exhaust gases then flow from the housing 102 to line 102a into an aspirator 180 for purposes hereinafter explained.

*The purification section*

In the embodiment appearing in FIGURE 2a sea water is employed for removal of $CO_2$ from the mixture of $CO_2$ and hydrgen gas in a primary removal section and molecular sieve means, as a secondary filtration section, are employed.

A pair of sea water towers or scrubbers 131 and 132 are connected to the conduit 130 for removing $CO_2$ from the mixture with hydrogen gas. A flow regulator 133 shown in block form in FIGURE 2a permits bypass from conduit 130 of the mixture through conduit 133a to scrubber 131. A portion of the mixture is fed through line 134 to the scrubber 132. After passing through the scrubbers 131–132, the mixture of $H_2$ and $CO_2$ plus any inert gases which may be present pass out to a conduit 135 which communicates with the reformer 35. Conduit 135 supplies the mixture in heat exchange relation with the burner 95 to reheat the gases in heat exchanger 136'. From the chamber 35 the heated mixture having a high hydrogen content passes through a conduit 137 for supply to a molecular sieve, generally indicated by the numeral 138 for further filtration.

Each of the filtration units 131 and 132 may be in the form of a bubble cap plate tower, a sieve plate tower, a packed tower and the like. Preferably the filtration units 131 and 132 are of the packed column type, 3 feet in diameter and 5 feet high. The sea water is introduced in countercurrent flow relation to the flow of the mixture of $CO_2$ and $H_2$.

When employing sea water, a portion of the hydrogen is lost, it will be appreciated, by solution with the sea water. For a system investigated, the loss of $H_2$ in the sea water would be approximately 2.86% of the total $H_2$ calculated to be entering the scrubber.

It will be observed from FIGURE 2 that the sea water will remove approximately 371 lbs. of $CO_2$ per hour plus inerts that may be present in the mixture entering the scrubbers.

It will also be appreciated that other methods, including scrubbing of the mixture of the carbon dioxide and hydrogen with amine solutions, mono- or diethanolamine, carbonate solutions, and caustic solutions, may be employed.

Preferably sea water is employed for this purpose. Control of the flow rate of the sea water into the scrubbers is a function of the amount of methanol and water reacted, the pressure in the scrubber and the sea water temperature. Preferably, a pneumatically operated metering valve is employed for this purpose. To maintain the liquid level in the scrubber, a sight glass 160 and 161 may be employed so that the operator of the equipment can determine whether the level control is functioning properly. The liquid level, and thus efficiency of the scrubbers, may be controlled by means such as shown in FIGURE 6.

Figure 6:
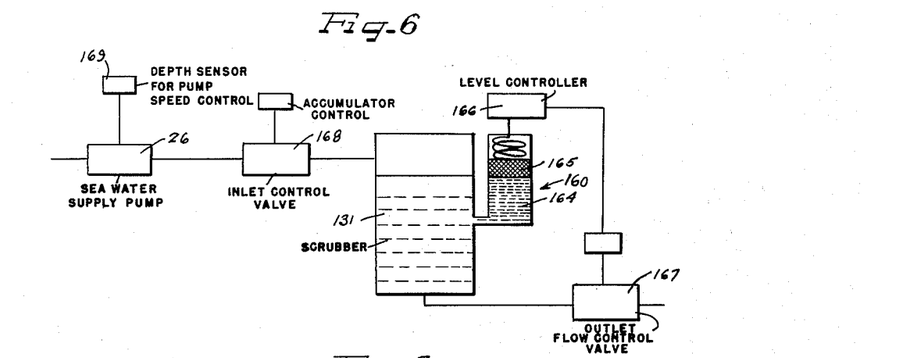
FIGURE 6 is a schematic view of a supply system for feeding sea water to a hydrogen filtration assembly.

In FIGURE 6, the scrubber 131 has a level chamber 164. The level of the liquid in scrubber 131 controls the position of a plunger 165 in chamber 164 which actuates a level control device 166. The level control device 166 controls operation of the outlet for control valve 167. In this modification, the function of the outlet valve 167 is that of maintaining proper liquid level. Thus the device 166 and valve 167 are independent of other controls.

The scrubber 131 is also provided with an inlet control valve 168. The speed of the sea water pump 26 is controlled by a depth sensor 169. The depth sensor 169 controls pump speed to compensate for increased inlet pressure to the pump caused by changes in submarine depth.

In FIGURE 2a the physical sequence of devices for removal of $CO_2$ includes a system wherein the mixture of hydrogen gas and $CO_2$ is supplied to the scrubbers 131 and 132 for removal of the bulk of the $CO_2$ and inert gases which may be present in the mixture.

In the embodiment appearing in FIGURE 2a, molecular sieve means 138 receive the mixture of carbon dioxide and hydrogen from the reformer 35. The sieve means 138 comprise a plurality of palladium alloy membranes through which the mixture of gases will pass. Hydrogen gas will diffuse selectively through a 0.8 mil thick palladium alloy membrane at rates of 1.3 lbs. per hour per square foot at 850° F. with a pressure drop of 400 p.s.i. The mixture of carbon dioxide and hydrogen is first preheated in the heat exchanger 136 before supply thereof to the molecular sieve means 138. A bleed outlet 170 is provided for preventing build up of non-diffusable components in the sieve means. It has been shown that at low pressures, the diffusion rate of hydrogen through palladium alloy is proportional to the pressure drop across the membrane and that, at higher flows, proportional to the difference of the square root of the pressures.

The gases containing a major amount of $CO_2$, under the control of a pump 171 are fed through a check valve 172 to a flow splitter 173 which supplies a portion of the bled gases to line 174 into the scrubber 131 and a portion of the bled gases through line 175 into the scrubber 132 for refiltration thereof. A heat exchanger 176 is provided adjacent the molecular sieve means 138 to cool the bled gases. The substantially impurity free hydrogen gas passes through conduit 189 to an accumulator 190. The sea water, contaminated with $CO_2$ and inert gases, is removed from the scrubbers 131 and 132 through conduits 177 and 178. The flow from conduits 177 and 178 combine in line 179 and provides the cooling medium for the heat exchanger 176. An aspirator 180 which aspirates the exhaust gases from burner 95 communicates with conduit 181, having a one-way check valve from the heat exchanger 176. The aspirator 180 is under the influence of the sea water pump 183. From the aspirator 180, the reactor products from the burner 95 fed by line 102a mix with the sea water and are discharged overboard under the influence of pump 183 through a line 184.

The sea water is supplied through pump 26 over line 25 through a flow splitter 26 which supplies the sea water through branch lines 26a and 26b to the scrubbers 131 and 132 respectively. Pumps 26 and 183 are controlled by the control unit 124 appearing in FIGURE 2a proportionately to assure the correct flow rate through the scrubbers 131 and 132. A valve 187 actuatable by the control unit 124 controls flow of the sea water into pump 26.

Substantially impurity free hydrogen gas flows from the molecular sieve means 138 over line 189 to an accumulator 190. From the accumulator 190 the hydrogen gas flows through a conduit 191 to the fuel cell 30 under the influence of a pressure regulator 192.

Figure 8:
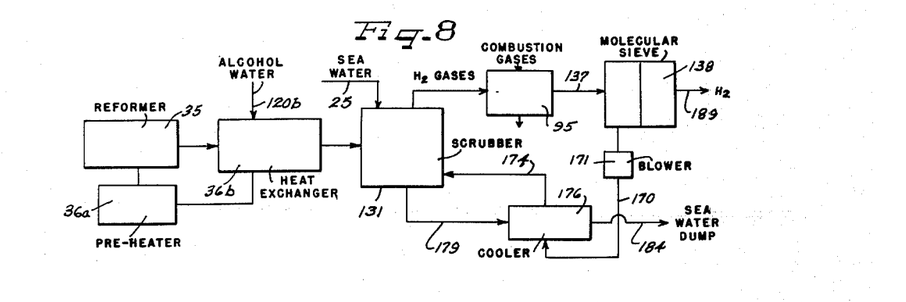
FIGURE 8 is a generally schematic view of an alternative arrangement for purification of hydrogen.

The purification section including the scrubbers and molecular sieve means are shown in block form in FIGURE 8.

Figure 7:
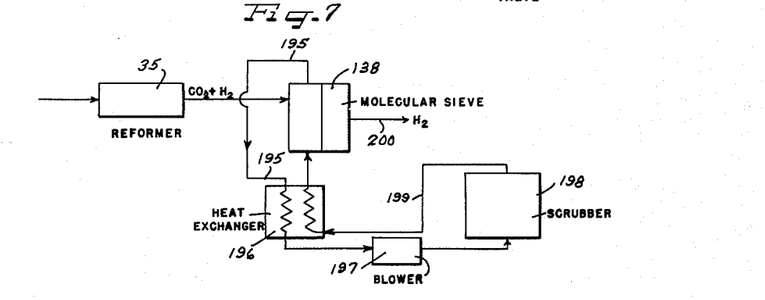
FIGURE 7 is a generally schematic view of an arrangement suitable for purification of hydrogen.

A modified form of purification section appears in FIGURE 7 wherein the mixture of carbon dioxide and hydrogen flows first into a molecular sieve means 138, from the sieve means over line 195 to a heat exchanger 196, and from the heat exchanger under the influence of a pump or blower 197 to a sea water scrubber 198 similar in construction and operation to the scrubbers 131 and 132. From the scrubbers 198 in which the majority of the carbon dioxide is removed from the hydrogen, the mixture of hydrogen and carbon dioxide is flowed over line 199 into the heat exchanger 196 in heat exchange relation with the incoming mixture over line 195 and into the molecular sieve 138. From the molecular sieve 138 the substantially impurity free hydrogen flows over line 200 to the fuel cell.

Pumping of the sea water to the scrubbers 131 and 132 involves flow rates approximating 100 g.p.m. at 600 p.s.i. Preferably centrifugal pumps are employed although positive displacement pumps or reciprocating pumps find utility in the present invention. Filtration may become a problem if the system is to be employed for a period of time. Conventional filter devices may be employed in appropriate locations in the sea water, methanol, fresh water and liquid oxidizer supply lines. The particular location of such filtration devices will depend upon the final construction. Corrosion may become a problem. Preferably the conduits for flow of the hydrogen mixture are copper, zinc or alloy groups, i.e., copper-zinc alloys. Titanium and one titanium-seven manganese alloys have proved satisfactory from a corrosion standpoint as has 2-S aluminum. A stable chromium-oxide surface film as in 430 and 331 steels are useable as are stainless steels of the 410 series. FIGURES 2 and 2a disclose the relative proportions of the components of the system in pounds per hour of hydrogen and $CO_2$, the temperature conditions and pressure conditions of the system.

Figure 9:
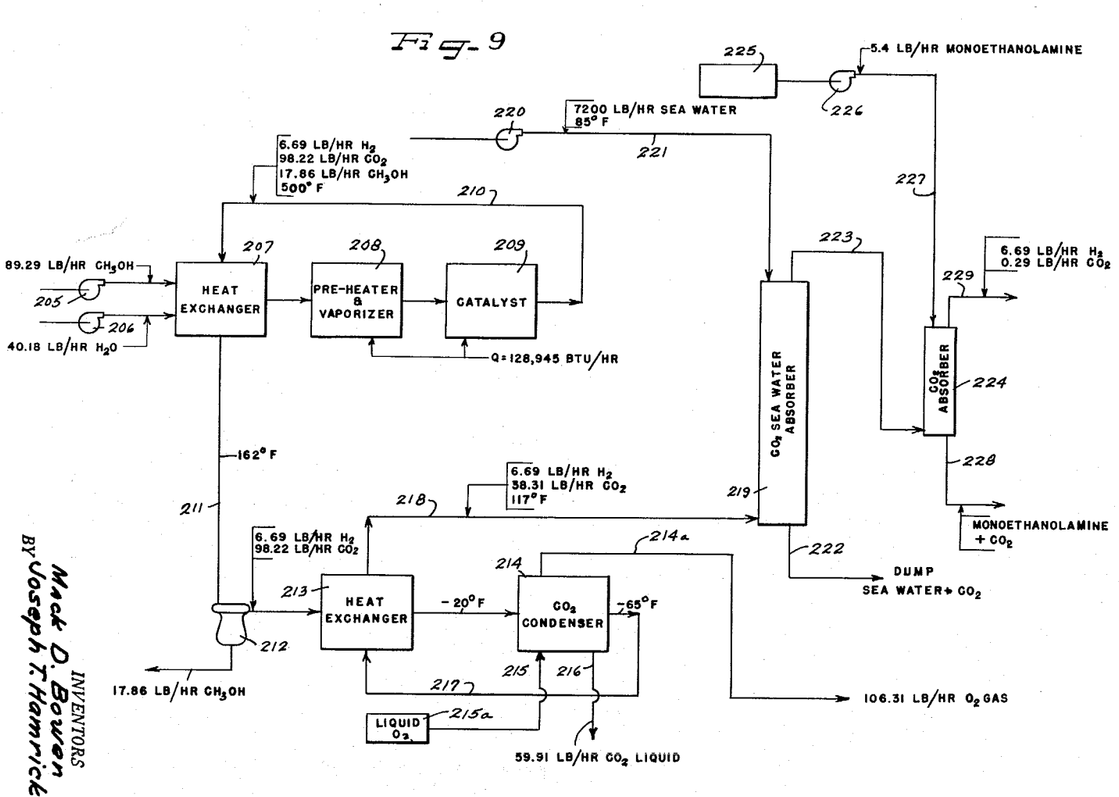
FIGURE 9 is a block diagrammtic view of an alternative hydrogen generation and purification system.

In FIGURE 9 a hydrogen gas generation and purification system is disclosed wherein methyl alcohol and fresh water are supplied through pumps 205 and 206 to a heat exchanger 207 wherein the mixture of methyl alcohol and fresh water are heated. From the heat exchanger 207 the mixture of methyl alcohol and water are supplied to a secondary heater and vaporizer 208. From the vaporizer 208 the vaporized mixture of methyl alcohol and water is supplied to the catalyst chamber 209 which may be identical in construction and operation to the reformer 35. From the chamber 209 the mixture of carbon dioxide and hydrogen gas flows through line 210 into the heat exchanger 207 for heating of the mixture of incoming methyl alcohol and water.

The temperature of the mixture of hydrogen and carbon dioxide drops from approximately 500° F. to approximately 162° F. in passing through the heat exchanger 207. From the heat exchanger 207 the mixture of carbon dioxide and hydrogen passes through a line 211 to a trap device 212 of conventional construction. The trap device or absorber is provided for removal of any liquid methanol or water which may not have reacted in the catalyst chamber 209 and had precipitated in the heat exchanger 207.

From the trap or absorber device 212 the mixture of carbon dioxide and hydrogen flows into a heat exchanger 213. The heat exchanger 213 provides means for cooling of the temperature of the mixture of hydrogen and carbon dioxide to approximately minus 20° F. At this temperature the mixture then flows into a carbon dioxide condenser 214 to which is supplied liquid oxygen over a line 215. The carbon dioxide liquifies and is removed from the system through a line 216. The hydrogen and remaining carbon dioxide leaves the condenser 214 at a temperature of approximately minus 65° and is looped back over line 217 into the heat exchanger 213. This mixture passes in heat exchange relation with the incoming mixture from the trap 212 and is the means whereby the temperature of the incoming mixture is reduced to minus 20° F. The mixture passing through line 217 has its temperature increased from minus 65° F. to approximately 117° F.

From the heat exchanger 213 this latter mixture passes over line 218 into a scrubber 219 identical in construction and operation to the scrubber 131. Sea water is pumped, as by pump 220 over line 221 into the scrubber 219 in countercurrent relation to the flow of the mixture of hydrogen and carbon dioxide. The sea water is removed with the absorbed carbon dioxide over line 222. The hydrogen mixture now substantially free of carbon dioxide is supplied from the scrubber 219 through line 223 into a second carbon dioxide absorber 224.

The $CO_2$ absorber 224 employs monoethanolamine supplied from a source 225 under the influence of a pump 226 to the absorber 224. The flow of the monoethanolamine is in counter current relation to the flow of the hydrogen and carbon dioxide mixture through conduit 227. The monoethanolamine and carbon dioxide are removed from the absorber 224 through a conduit 228 whereas the hydrogen containing a very small percentage of carbon dioxide is removed from the absorber 224 through a conduit 229 for supply thereof to the fuel cell 30. Molecular sieve means may also be used for $CO_2$ removal instead of monoethanolamine. The oxygen gas from the condenser 214 is exhausted through a conduit 214a to the fuel cell for reaction with $H_2$ or may be returned through means (not shown) to the source of the liquid oxygen, generally indicated by the numeral 215a.

In the embodiment of the present invention appearing in FIGURE 10, the carbon dioxide condenser 214 and heat exchanger 213 have been eliminated from the circuit and the line 218 connected from the trap or absorber 212 directly to the absorber 219. In this embodiment, the flow rate of sea water is increased to approximately 10,800 lbs. per hour to compensate for the flow requirements of the mixture of carbon dioxide and hydrogen.

Thus, it will be appreciated that with the present invention a system for generating hydrogen gas from water and alcohol and purifying the hydrogen gas is provided which is compatible with existing submarine space limitations and a system in which the components are arranged in relation to each other to assure the most efficient utilization of the temperature and pressure conditions present in the system.

Although various minor modifications of the present invention may become readily apparent to those versed in the art, it should be understood that I wish to embody within the scope of the patent warranted hereon all such embodiments as reasonably and properly come within the scope of my contribution to the art.

We claim as our invention:

1. A substantially impurity free hydrogen producing system adapted to produce substantially impurity free hydrogen for use in underwater vehicles and the like comprising:
   water supply means,
   alcohol supply means,
   a water-alcohol hydrogen generator to produce a hydrogen-impurity reaction product,
   a first heat exchanger,
   a water and alcohol delivery means connecting the water and alcohol supply means to the generator to deliver water and alcohol to the generator,
   a sea-water hydrogen purifying scrubber having means to remove a major portion of the impurities in the hydrogen-impurity reaction product,
   said first heat exchanger being formed by a first conduit connecting said generator to said sea water scrubber and circulating the hydrogen-impurity reaction products in heat-exchange relation with said alcohol and water delivery means,
   a liquid by-pass conduit means connected to said first heat exchanger and said delivery means to deliver reaction product water condensed in said first heat exchanger to said delivery means,
   said first conduit means connected to deliver the hydrogen-impurity reaction product to said scrubber to remove a major portion of the impurities in the hydrogen-impurity mixture and producing high hydrogen content fluid,
   a molecular sieve having diffusing membranes for separating the hydrogen from the hydrogen-impurity reaction product,
   third conduit means connecting said scrubber to said molecular sieve to deliver the high hydrogen content fluid from the scrubber to the molecular sieve,
   said third conduit means circulating said high hydrogen content fluid in heat exchange relation with said generator to heat said high hydrogen content fluid,
   whereby hydrogen removed from said molecular sieve is substantially impurity free hydrogen.

2. A substantially impurity free hydrogen producing system adapted to produce substantially impurity free hydrogen for use in underwater vehicles and the like comprising:
   water supply means,
   alcohol supply means,
   a water-alcohol hydrogen generator to produce a hydrogen-impurity reaction product,
   a water and alcohol delivery means connecting the water and alcohol supply means to the generator to deliver water and alcohol to the generator,
   a molecular sieve having diffusing membranes for separating the impurities from the hydrogen-impurity reaction product,
   a first conduit means connecting the generator with the molecular sieve to deliver the hydrogen-impurity mixture thereto,
   a heat exchanger,
   a sea-water hydrogen purifying scrubber having means to absorb the impurities of the hydrogen impurity reaction product,
   a second conduit means connecting said sea water scrubber to the molecular sieve to deliver the sieve hydrogen-impurity mixture to the scrubber to produce a high hydrogen content fluid,
   said second conduit passing the hydrogen-impurity mixture through said heat exchanger in heat exchange relationship,
   a third conduit means connecting the scrubber and the molecular sieve to deliver the high hydrogen content fluid to the molecular sieve,
   said third conduit means passing the high hydrogen content fluid through the heat exchanger in heat exchange relationship, and
   means to remove substantially impurity free hydrogen from said molecular sieve.

3. A substantially impurity free hydrogen producing system adapted to produce substantially impurity free hydrogen for use in underwater vehicles and the like comprising:
   water supply means,
   alcohol supply means,
   a water-alcohol hydrogen generator to produce a hydrogen-carbon dioxide reaction product,
   a first heat exchanger,
   a water and alcohol delivery means connecting the water and alcohol supply means to the generator to deliver water and alcohol to the generator,
   a sea-water hydrogen purifying scrubber having means to absorb carbon dioxide,
   said first heat exchanger being formed by a first conduit connecting said generator to said heat exchanger to circulate the hydrogen-carbon dioxide reaction product in heat exchange relation with said alcohol and water delivery means,
   a carbon dioxide condenser,
   a second conduit connected to said heat exchanger and said condenser to deliver the hydrogen-carbon dioxide mixture from said heat exchanger to said condenser to condense a portion of the carbon dioxide in the hydrogen-carbon dioxide mixture,
   third conduit means connected to said condenser and scrubber to deliver the hydrogen-carbon dioxide mixture from the condenser to the scrubber,
   means to remove the condensed carbon dioxide from the condenser,
   said third conduit means circulating the hydrogen-carbon dioxide mixture in heat exchange relationship with the second conduit means to cool the hydrogen-carbon dioxide mixture being delivered to the condenser by said second conduit means,
   a molecular sieve having membranes for separating hydrogen from carbon dioxide,
   said sea-water scrubber removing a major portion of the carbon dioxide from the hydrogen-carbon dioxide mixture received from the condenser to produce a high hydrogen content fluid,
   a fourth conduit means connected to said scrubber and said molecular sieve to deliver the high hydrogen content fluid to the molecular sieve,
   said molecular sieve separating the remaining carbon dioxide impurities from said high hydrogen content fluid to provide substantially impurity free hydrogen, and
   means to remove the substantially impurity free hydrogen from said molecular sieve.

4. A substantially impurity free hydrogen producing system adapted to produce substantially impurity free hydrogen comprising:
- water supply means,
- alcohol supply means,
- a water-alcohol hydrogen generator to produce a hydrogen-impurity reaction product,
- a water and alcohol delivery means connecting the water and alcohol supply means to the generator to deliver water and alcohol to the generator,
- a hydrogen purifying scrubber,
- a first conduit means connecting the generator and the scrubber to deliver the hydrogen-impurity reaction product to the scrubber,
- said scrubber having means to remove a major portion of the impurities from the hydrogen-impurity product to produce a high hydrogen content product,
- an impurity separating molecular sieve for removing the impurities from the hydrogen-impurity reaction product,
- a second conduit means connecting said scrubber to said molecular sieve to deliver the high hydrogen content product from the scrubber to the molecular sieve,
- said molecular sieve having diffusing membranes to separate the remaining impurities from said high hydrogen content product to provide substantially impurity free hydrogen, and
- means to remove the substantially impurity free hydrogen from said molecular sieve.

5. A substantially impurity free hydrogen producing system adapted to produce substantially impurity free hydrogen comprising:
- water supply means,
- alcohol supply means,
- a water-alcohol hydrogen generator to produce a hydrogen-impurity reaction product,
- a water and alcohol delivery means connecting the water and alcohol supply means to the generator to deliver water and alcohol to the generator,
- an impurity removing molecular sieve having means for separating the impurities from the hydrogen-impurity reaction product,
- a first conduit means connecting the generator with the molecular sieve to deliver the hydrogen-impurity mixture thereto,
- a hydrogen purifying scrubber,
- a second conduit means connecting said scrubber to the molecular sieve to deliver the sieve hydrogen-impurity mixture to the scrubber,
- said scrubber having means to remove a major portion of the impurities from the hydrogen-impurity product to produce a high hydrogen content product,
- a third conduit means connecting said scrubber to said molecular sieve to deliver the high hydrogen content product from the scrubber to the molecular sieve,
- said molecular sieve having diffusing membranes for separating the remaining impurities from said high hydrogen content product to provide substantially impurity free hydrogen, and
- means to remove the substantially impurity free hydrogen from said molecular sieve.

References Cited in the file of this patent
UNITED STATES PATENTS

| | | |
|---|---|---|
| 1,904,593 | Young et al. | Apr. 18, 1933 |
| 1,923,656 | Beekley | Aug. 22, 1933 |
| 2,546,013 | Peck et al. | Mar. 20, 1951 |
| 2,768,405 | Mineah | Oct. 30, 1956 |
| 2,894,732 | Taber et al. | July 14, 1959 |
| 3,024,868 | Milton | Mar. 13, 1962 |